April 21, 1931.   C. E. CHALMERS   1,801,798
CHANGE MAKING MACHINE
Filed Feb. 19, 1925    9 Sheets-Sheet 1

Inventor
CHARLES E. CHALMERS
By Bohleber & Ledbetter
Attorneys

April 21, 1931. C. E. CHALMERS 1,801,798
CHANGE MAKING MACHINE
Filed Feb. 19, 1925 9 Sheets-Sheet 3

Inventor
CHARLES E. CHALMERS
By Attorneys
Bohleber & Ledbetter

April 21, 1931.    C. E. CHALMERS    1,801,798
CHANGE MAKING MACHINE
Filed Feb. 19, 1925    9 Sheets-Sheet 5

Inventor
CHARLES E. CHALMERS
Attorneys
Bohleber & Ledbetter

April 21, 1931.  C. E. CHALMERS  1,801,798
CHANGE MAKING MACHINE
Filed Feb. 19, 1925  9 Sheets-Sheet 6

Inventor
CHARLES E. CHALMERS
By Bohleber & Ledbetter
Attorneys

April 21, 1931.   C. E. CHALMERS   1,801,798
CHANGE MAKING MACHINE
Filed Feb. 19, 1925   9 Sheets-Sheet 8
FIG.10.
FIG.11.
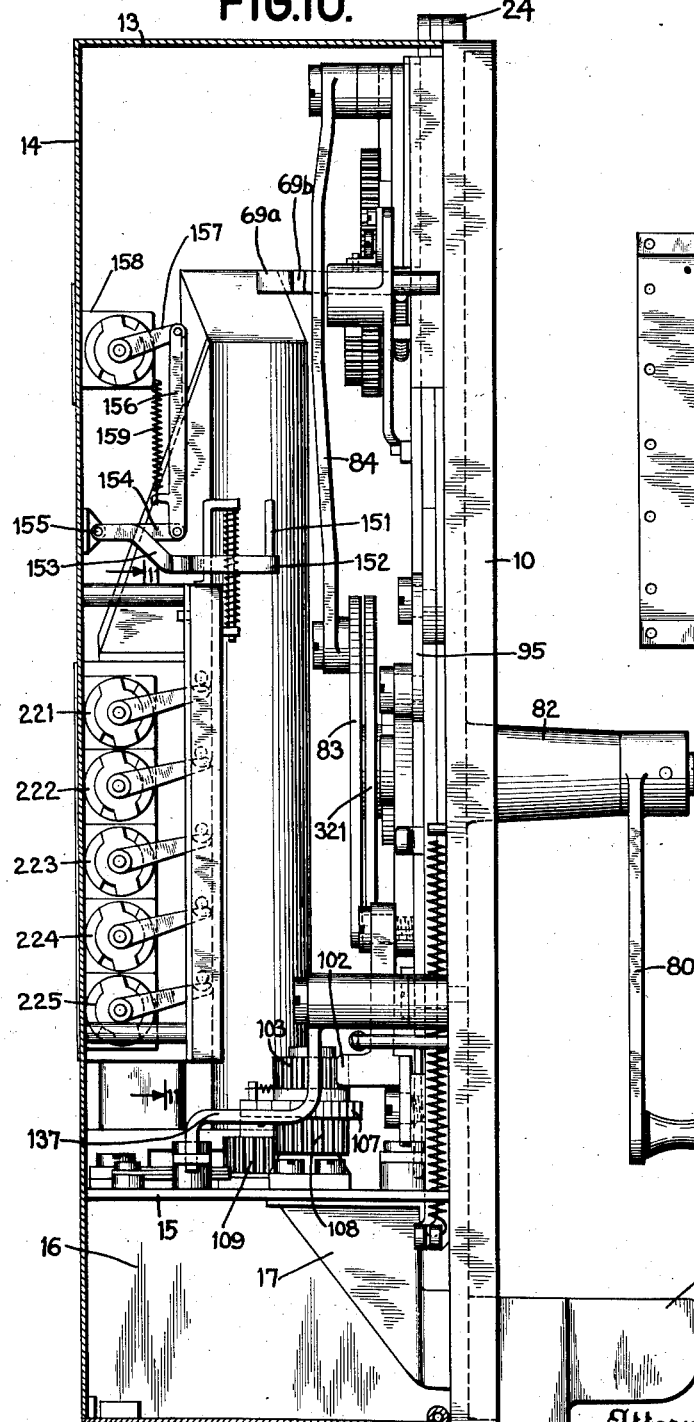
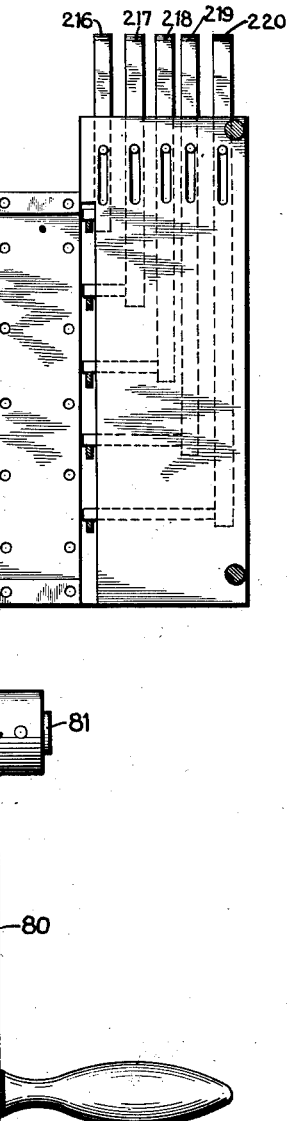
Inventor
CHARLES E. CHALMERS
Attorneys
Bohleber & Ledbetter April 21, 1931. C. E. CHALMERS 1,801,798
CHANGE MAKING MACHINE
Filed Feb. 19, 1925 9 Sheets-Sheet 9
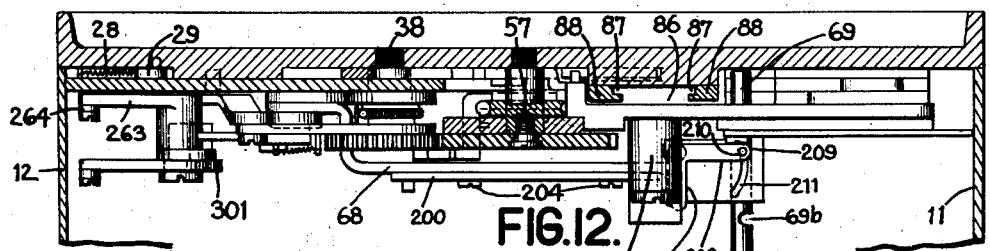
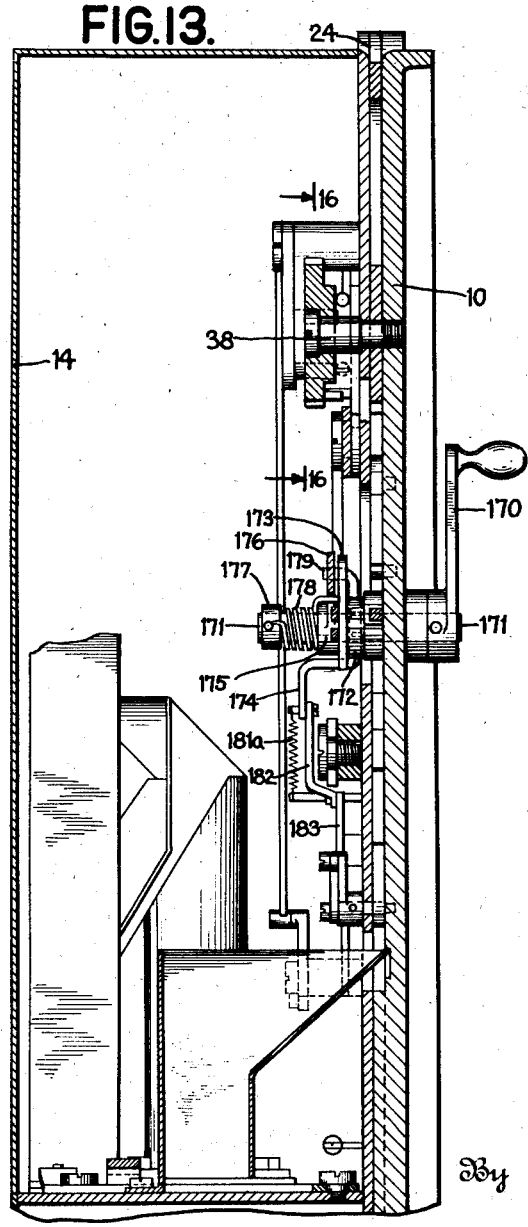
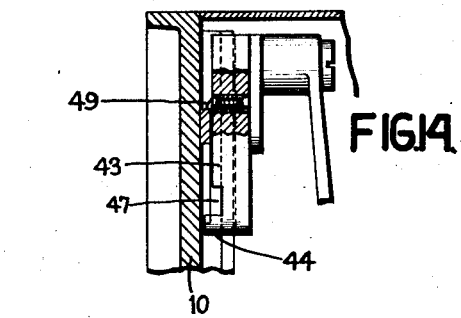
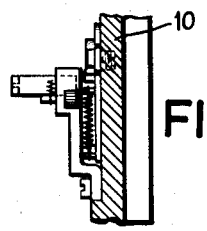
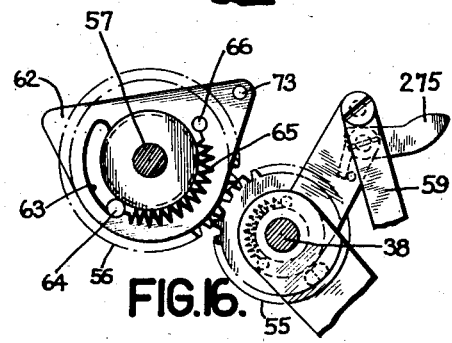
Inventor
CHARLES E. CHALMERS
By Attorneys
Bohleber & Ledbetter Patented Apr. 21, 1931

1,801,798

UNITED STATES PATENT OFFICE

CHARLES E. CHALMERS, OF NEW YORK, N. Y.

CHANGE-MAKING MACHINE

Application filed February 19, 1925. Serial No. 10,183.

This invention relates to fare collecting and change making machines and while the embodiment herein illustrated is described as being utilized primarily for collecting fares on motive vehicles, it is to be understood that the invention is not limited to such use, as it will be readily manifest from the following description and the accompanying drawings that it has numerous other kindred uses and applications.

The invention has to do with a simple and improved machine of the above character which is not only capable of receiving the exact fare, but which will return the necessary change whenever a passenger drops a coin therein of a denomination or value higher than the price of such fare, and for the purposes of elucidating the principles of my invention, the preferred embodiment illustrated and described is designed upon a five cent fare basis; consequently the change returned, if any, is either five cents or a multiple thereof.

One of the more important features of the present invention is the provision of improved mechanism for receiving a fare from a coin of any denomination deposited in the machine, in combination with improved mechanism employed in connection therewith for registering on a single counter the exact number of fares taken from said coin, or, more broadly stated, for registering the net amount of cash received in or collected by the machine.

In the preferred embodiment of my invention illustrated and described herein, the coins utilized for making change comprises preferably only five and twenty-five cent pieces, as that reduces very materially the bulk of the machine as compared with a machine embodying the same principles, and which utilizes only one coin or a different group of coins for making change. On the other hand, this enables the mechanism to be reduced to a much simpler form, as compared with a machine embodying the same principles and which is equipped to return more than the stated number of change coins. However, it will be readily apparent that the invention is not limited in this respect to the specific form hereinafter described and illustrated in the accompanying drawings, nor is it to be understood that the invention is to be limited to a form of machine capable of receiving only a five cent fare. In short, the principles are the same irrespective of the number of coins utilized for making change and irrespective of the fare charged.

In the machine which utilizes only the five and twenty-five cent pieces in making change, I have found it to be inconvenient to carry in the change box the necessary supply of five cent pieces to make change particularly over long routes or where the traffic is heavy. Accordingly I have devised means automatically actuated from the operating crank to utilize for change making purposes all, if necessary, of the five cent and twenty-five cent pieces deposited by the passengers in payment of their fares. The coins deposited by the passengers and utilized for change making purposes are supplied to storage magazines and discharged therefrom from the bottom thereof, the parts being so timed and so related that the mechanism for feeding the coins to said magazine will not interfere with the mechanism for returning change therefrom. The improvements in this regard are considered as among the more important features of my invention.

One of the serious objections heretofore of all coin operated machines, is the fraudulent use made of the same by the deposit therein of slugs and spurious coins. This objection is entirely overcome in this machine for the reason that any slug or spurious coin dropped into the coin chute may be readily returned or rejected by the operator without interfering in the least with the receiving of the genuine coins deposited. In keeping with the foregoing mechanism is provided under the control of the operator for directing the coins in said chute at will either into a passageway leading the same to an operative position in the machine, or into a passageway to enable the return of the coin deposited. And in case the coins are returned I have provided means for making a register thereof, and another important feature of my invention resides in the simple mechanism which I have devised for effecting the return of spurious coins in combination with the registering mechanism associated therewith.

The actuation of the change return mechanism is controlled through the intermediary of the coins after the same have been properly located in operative position in the machine. In the present embodiment of my invention this is accomplished by the sequence of operations of the various parts in performing their respective functions. The mechanism for accomplishing this result is an important feature of my invention.

Another of the more important features of this invention is the incorporation in a machine of this type of simple mechanism for taking care of all of the features above related, and in the ability of the machine to be readily applied to collecting machines of general application and use.

Further objects, features and advantages of construction and mode of operation will more fully appear from the detailed description below taken in connection with the accompanying drawings in which, Fig. 1 is a vertical section of the casing illustrating the mechanism of the machine a portion of which is supported on the interior of the front wall of the casing and a portion of which is located upon a horizontal base plate suitably supported by the walls of the casing;

Fig. 2 is a view similar to Fig. 1 illustrating the positions of the mechanism which they assume after having deposited a five cent piece in operative position to be received into the machine or a penny in position to be rejected from the machine. The operating crank has been partially rotated. The coin magazines and the mechanism associated therewith are also shown in section;

Fig. 10 is a side elevation showing the casing in section.

Fig. 11 is a section taken on the line 11—11 of Fig. 10 showing certain details of the rejection counters.

Fig. 12 is a horizontal section taken on line 12—12 of Fig. 1.

Fig. 13 is a vertical section on line 13—13 of Fig. 1 illustrating in section certain parts of the mechanism employed for rejecting any particular coin or slug deposited.

Fig. 14 is a detail section taken on line 14—14 of Fig. 1.

Fig. 15 is a fragmentary section taken on line 14—15 of Fig. 1.

Fig. 16 is a section taken on line 16—16 of Fig. 12 illustrating certain details of the machine.

Figure 1:
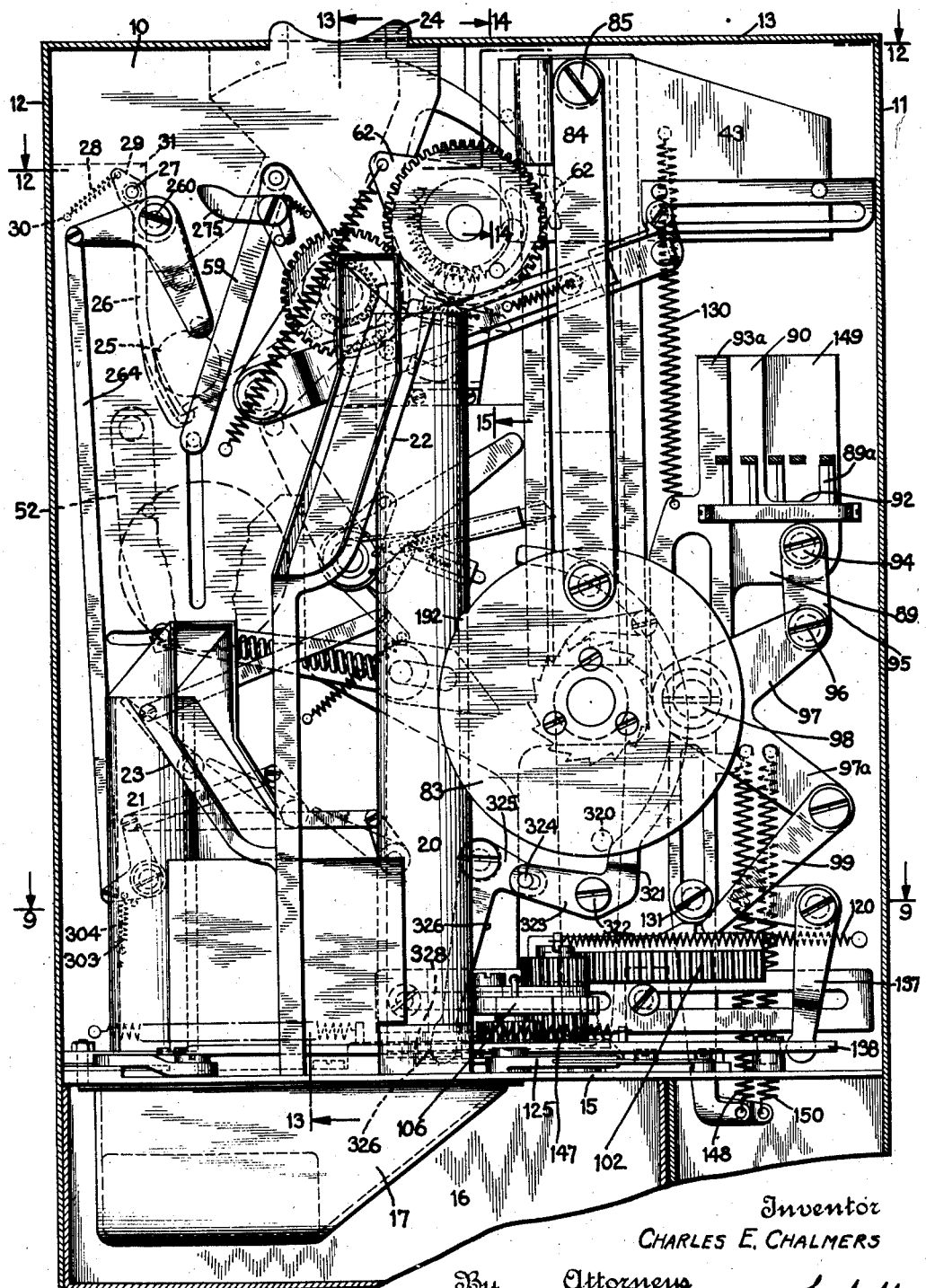

In the drawings herewith I have illustrated in sufficient detail, in compliance with the patent statutes, the necessary mechanism for enabling any one skilled in this art to build a machine embodying my invention for the specific purpose of collecting fares, charges, etc. The description will be more readily followed if it is borne in mind some of the more important features of construction and operation of the machine as a whole. The invention, among other things, comprises (1) means for enabling the coins to be examined; (2) mechanism to enable spurious coins or slugs to be rejected; (3) mechanism for enabling the admission of the coins into operative position in the machine; (4) mechanism controlled by the diameter of the coin deposited for determining the amount of change to be returned irrespective of the denomination of the coin; (5) a single counter common to the different denominations of coins deposited for registering the number of fares collected; and (6) change ejector mechanism common to the coins of different denominations. And it may be stated at this point that after the deposit of a genuine coin it is only necessary to actuate the operating crank 80 to return the appropriate change. It may be also stated at this point that the mechanism herein illustrated and described lends itself admirably for use with a machine for collecting multiple fares, see my copending application Serial Number 13,384, filed March 5, 1925.

Figure 6:
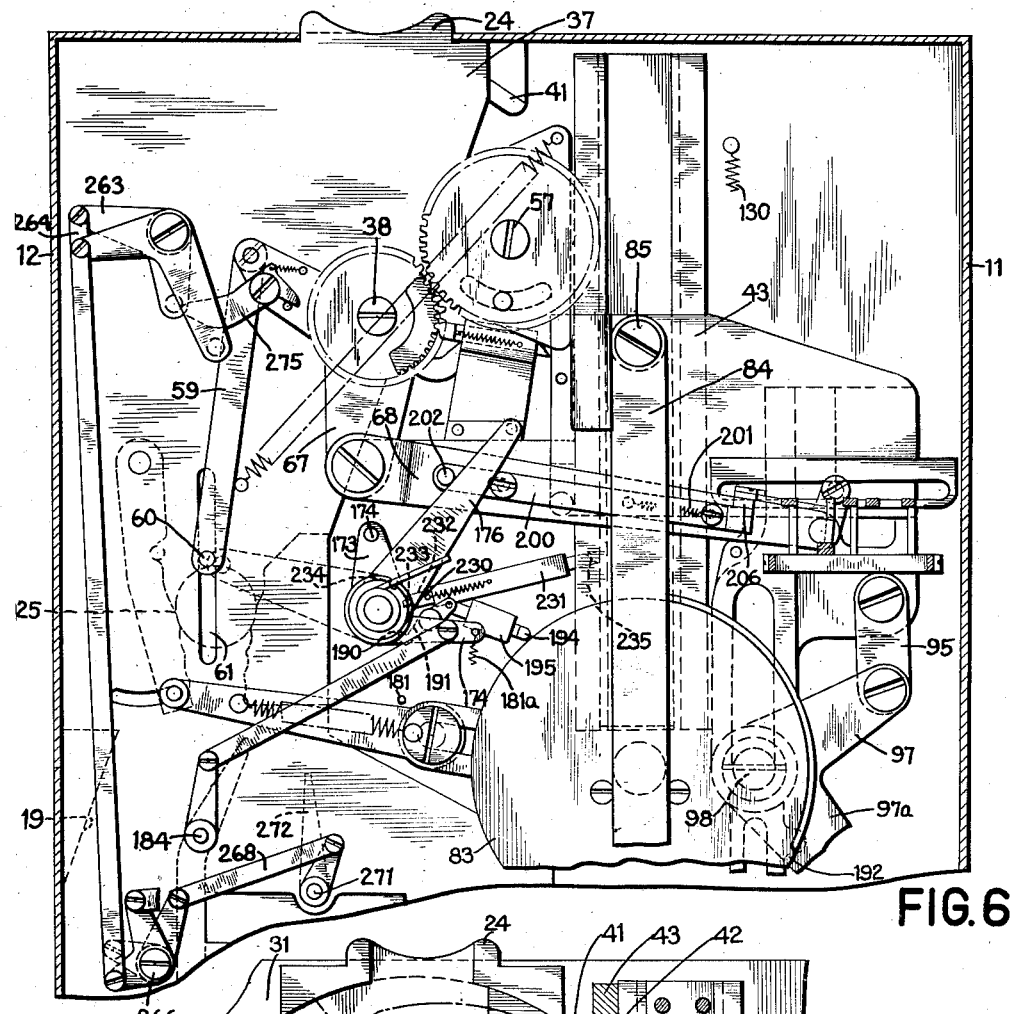
Fig. 6 illustrates a view similar to Fig. 4, in which a coin deposited is to be rejected, the coin rejecting mechanism having been set for that purpose and the mechanism having been operated to effect the rejection thereof.
Figure 9:
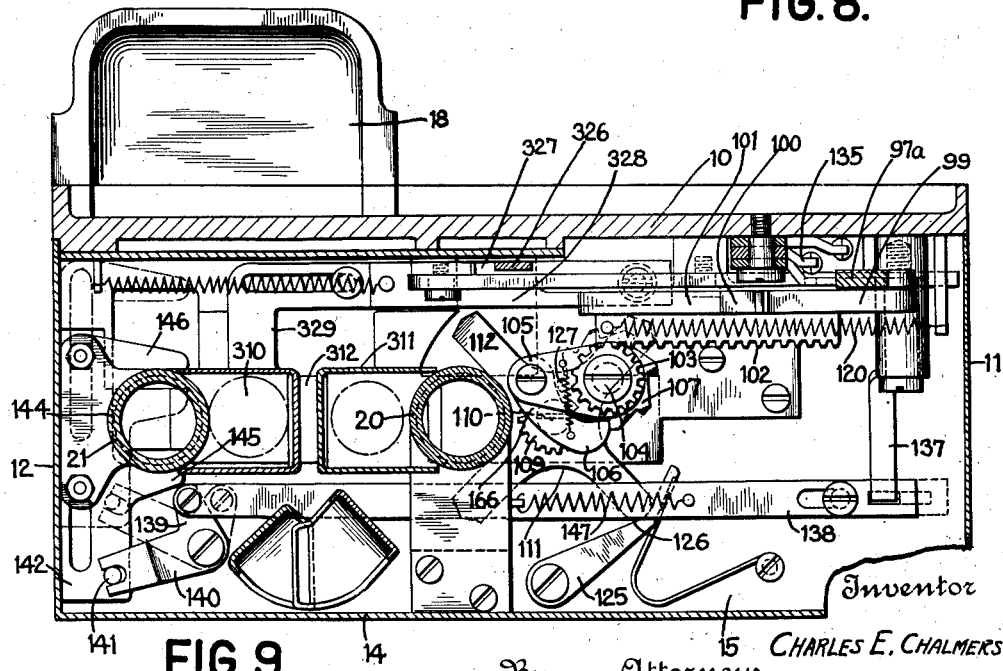
Fig. 9 is a horizontal section taken on line 9—9 of Fig. 1.

Referring to the drawings in detail the reference numeral 10 (see Figs. 9 and 10)

designates the front wall, the numerals 11 and 12 the side walls, the numeral 13 the top wall, and the numeral 14 the rear wall of the casing in which and on which the mechanism of the machine is suitably supported. Adjacent the lower end of the casing the machine is equipped with a horizontal ledge or platform 15 upon which certain mechanism is supported, including the coin stacks more specifically referred to hereinafter. Below the horizontal plate 15 is the compartment 16 for receiving the coins deposited into the machine. This compartment receives the ten, fifty and one cent coins, if accepted. The five-cent pieces and the twenty-five cent pieces are received into this compartment after overflowing from the tops of the coin stacks, as will more fully hereinafter appear. The reference numeral 17, designates a coin chute which discharge five and twenty-five cent pieces as change to the change receptacle 18, the latter being located upon the exterior of the machine. If any coin is rejected it is discharged from the passageway 19, see Fig. 6, to the chute 17 and thence also to the receptacle 18.

Figure 7:
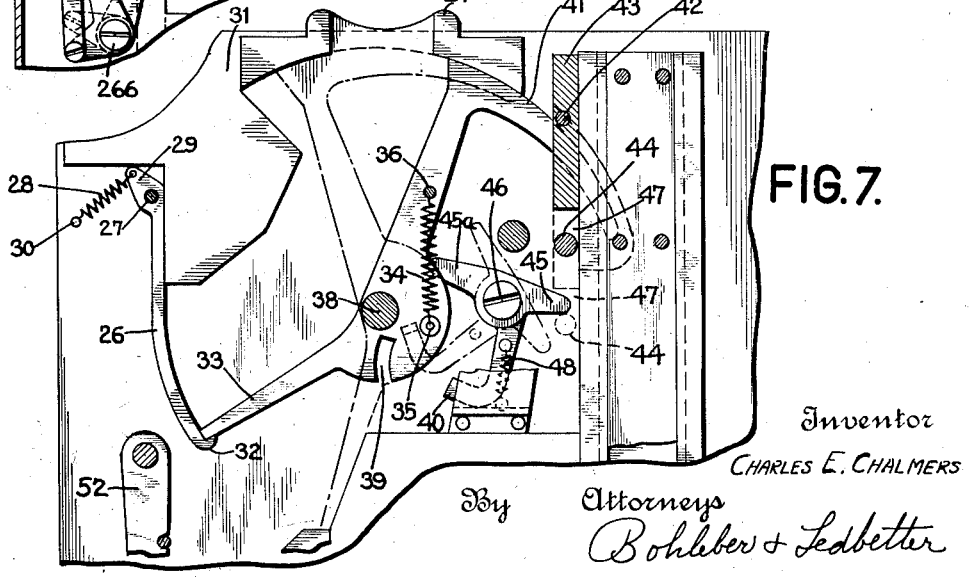
Fig. 7 illustrates the detail mechanism employed in locking the chute closing mechanism in operative position to prevent insertion of additional coins. The operative position is illustrated in dotted lines.

The coin magazine for receiving the five-cent pieces for change making is indicated by the reference numeral 20, and the coin magazine for receiving the twenty-five cent pieces for change making is illustrated at 21. It may be noted at this point that the five and twenty-five cent pieces are automatically fed to the stacks in the magazines from the bottom of the latter. These magazines are respectively provided with overflows 22 and 23, see Fig. 1, which connect with the coin compartment 16, so that any surplus coins of these denominations deposited in the machine, that is to say, more than necessary to fill the magazines, are discharged into the compartment 16. The chute into which the coins are deposited in the machine is indicated by the numeral 24. In depositing coins in this chute the same assume different positions dependent upon the sizes thereof indicated at 25 in Figs. 2, 3, 4, 5 and 6, on their way to which they contact with and trip the lever 26 pivoted at 27, the same being held in normal position by means of a spring 28, one end of which is connected to the projection 29 and the other end of which is suitably connected to the machine casing at 30. The trip lever 26 (see Fig. 7) is limited in its movement under the tension of the spring 28 by its contact or engaging with the edge of the offset 31 on the front wall 10. The trip lever 26 is provided with a nose 32 which normally maintains the gate member 33 in normal open position to enable the coin to be deposited into the chute. When the coin trips the lever 26 it releases the gate member 33 and enables the latter to assume the dotted line position indicated in Fig. 7 under the tension of the spring 34, one end of which is connected to a stud 35 located upon the gate member 33 and the other end of which is connected to a stud 36, projecting from the plate 37 which constitutes one of the walls of the chute 24. The gate member 33 is pivotally mounted to rotate upon the stud 38 preferably projecting inwardly from the front wall of the machine. The gate member 33 is provided adjacent its pivotal point with a slot 39. When moved to the dotted line position illustrated in Fig. 7 this slot is brought in line with the trigger 40. When in the normal position the sector 41 of the gate 33 is in the path of a stud 42 located upon a vertically reciprocating slide element 43. The movement of the gate member to the dotted line position brings the sector 41 out of the path of the spring pressed stud 42, thus enabling the slide 43 to be operated by the operating crank 80 as will more fully hereinafter appear. The slide 43 is also equipped with a pin 44 which, upon the downward movement of the slide 43, engages with the bell arm 45. The trigger 40 is rigidly connected to the arm 45, the latter being mounted to rotate upon the stud 46. The movement of the bell arm therefore causes the trigger 40 to engage in the slot 39 of the gate member 36, thus locking the latter in dotted line position illustrated in Fig. 7 to prevent the gate member from being moved to normal position by anyone tampering therewith. The operative position of the bell arm 45 and trigger 40 is illustrated in dotted lines and is moved to this position by the pin 44. After the pin 44 is moved beyond the bell arm 45 the latter, together with the trigger 40 are locked in their dotted line positions by the inner wall of the slide 43 engaging with the bell arm 45. A space 47 is provided between the pin 44 and the bottom of the slide member 43. Upon the retrograde movement of the slide 43 the bell arm 45 ultimately engages within this space 47 under the tension of the spring 48. It is true that upon the downward movement of the slide 43 the end of the bell arm 45 will engage in the space 47, but this is not sufficient to withdraw the trigger 40 entirely from the slot 39. It will also be noted that the bell arm 45 upon the retrograde movement of the slide 43 will be moved in a counterclockwise direction by means of the pin 44 until the latter passes by the same, the bell arm 45 being thereafter returned to normal position also by the spring 48. Upon the movement of the bell arm 45 in a counterclockwise direction, as just described, the end 45$^a$ of said arm is adapted to engage with the projecting pin 35 on the gate member 33 and therefore restore the latter in normal position with the nose 32 engaging the inner end of the said gate member, as clearly illustrated in Fig. 7, the trip member 26 being cammed out of the path of the gate member 33 to effect such engagement, as will be understood. It will be further noted that upon the return movement of the slide member 43 the sector 41 will have been returned to normal position prior to the time that the slide has assumed its normal position. Consequently, the sector 41 will be in the return path of the spring pressed pin 42. However, the latter is provided with a beveled surface 49 (see Fig. 14) which enables the pin to ride over the surface of the sector.

Figure 2:
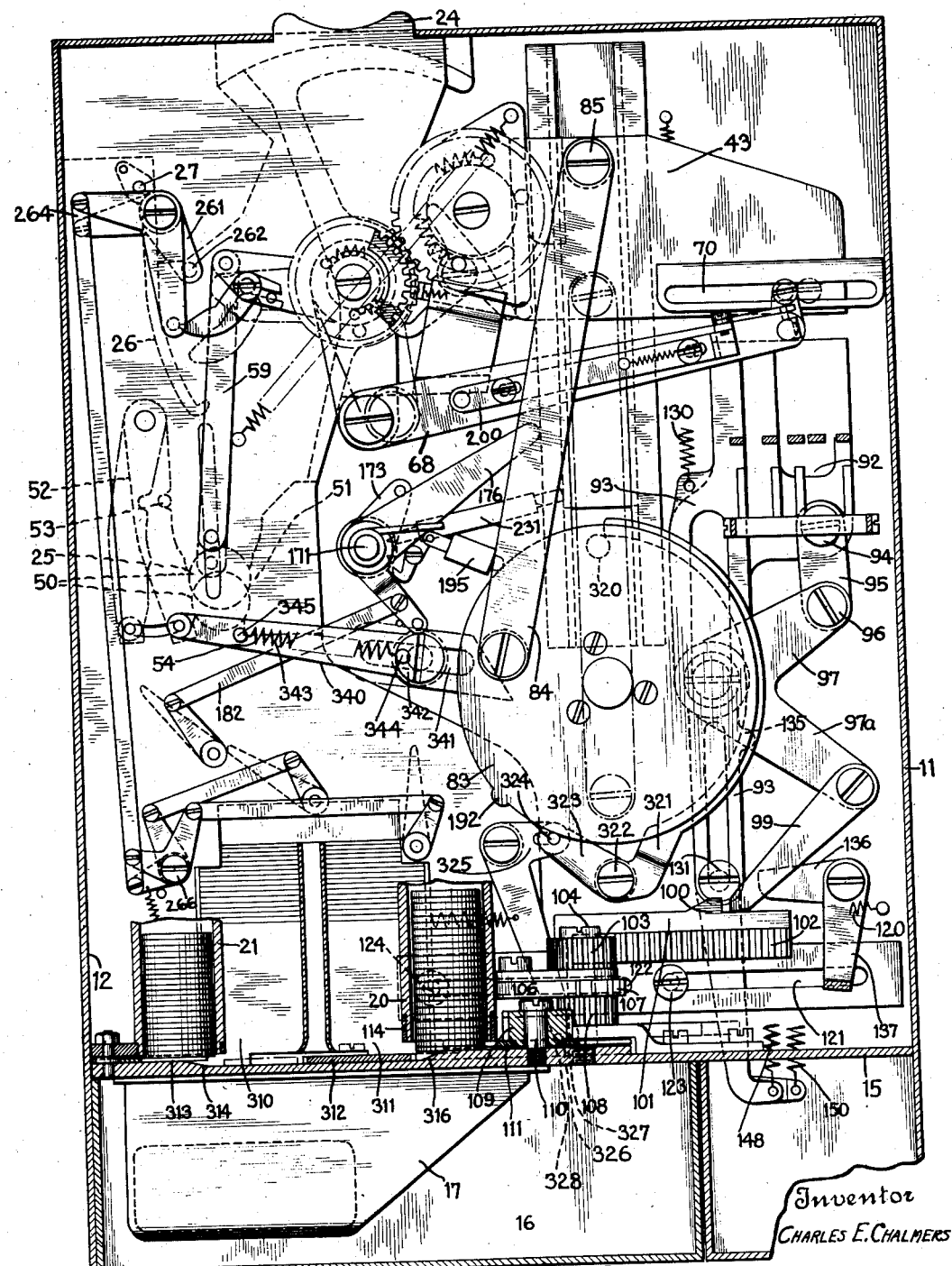
Figure 3:
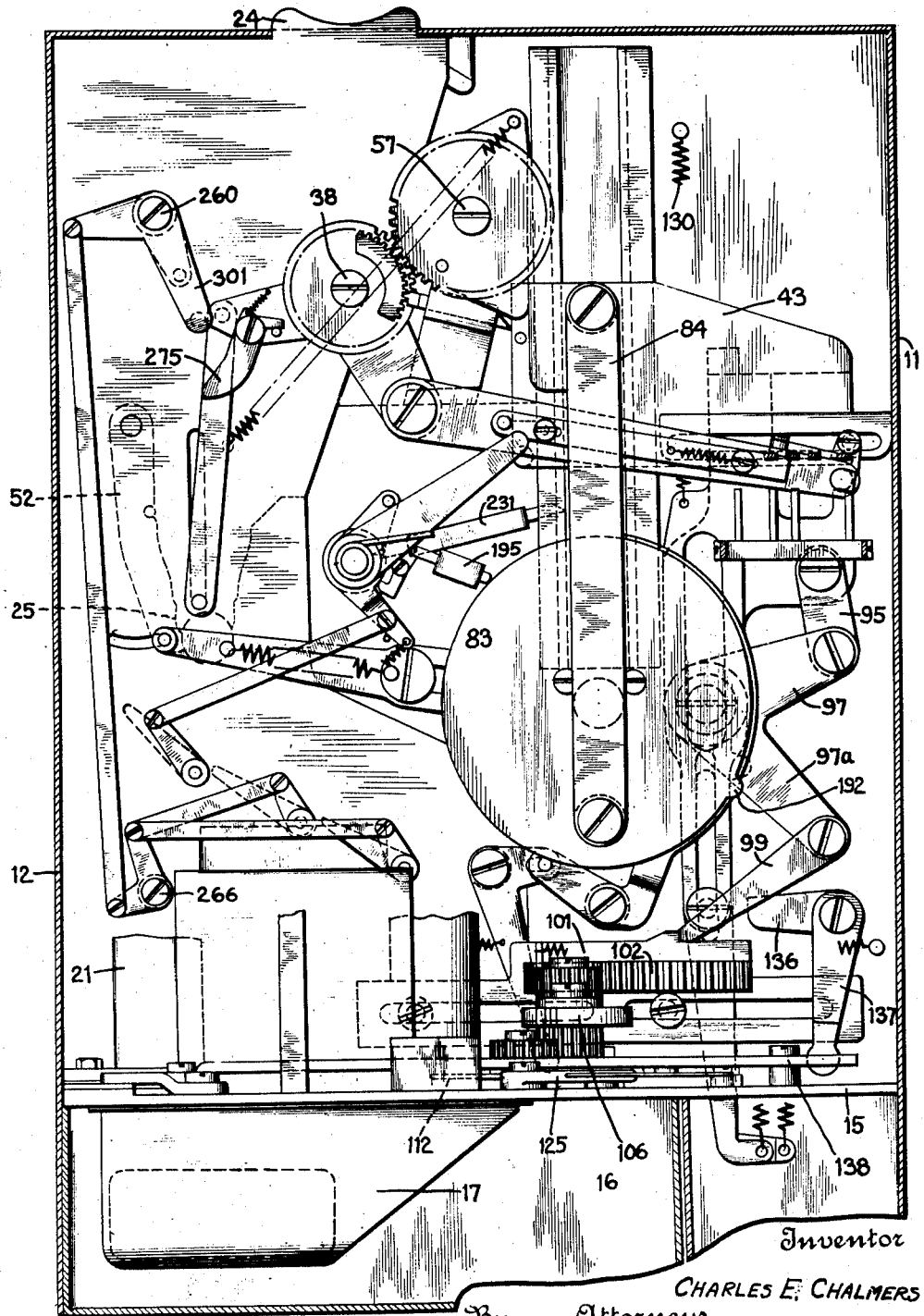
Fig. 3 illustrates a ten cent piece in operative position in the machine after all the parts have been operated to return change and the fare registered on the master counter.

The coin deposited in the chute 24 after tripping the lever 26 assumes the positions illustrated at 50 in Fig. 2 between the fixed member 51 and the pivoted arm 52. These members 51 and 52, by their configuration determine the positions of the respective coins deposited in the machine. In Fig. 2 there is illustrated a five cent and a one cent piece between said members. The movement of the member 52 in a counterclockwise direction is limited by its engagement with the pin 53. It is normally held against movement in a clockwise direction by means of the spring 54.

I will now proceed to describe the controlling mechanism positioner which serves to determine (1) the amount of change to be delivered, (2) whether a fare is to be recorded on the master counter, (3) the registering of any denomination of coin rejected, and (4) the distribution of coins into the compartment and into the magazines.

Figure 8:
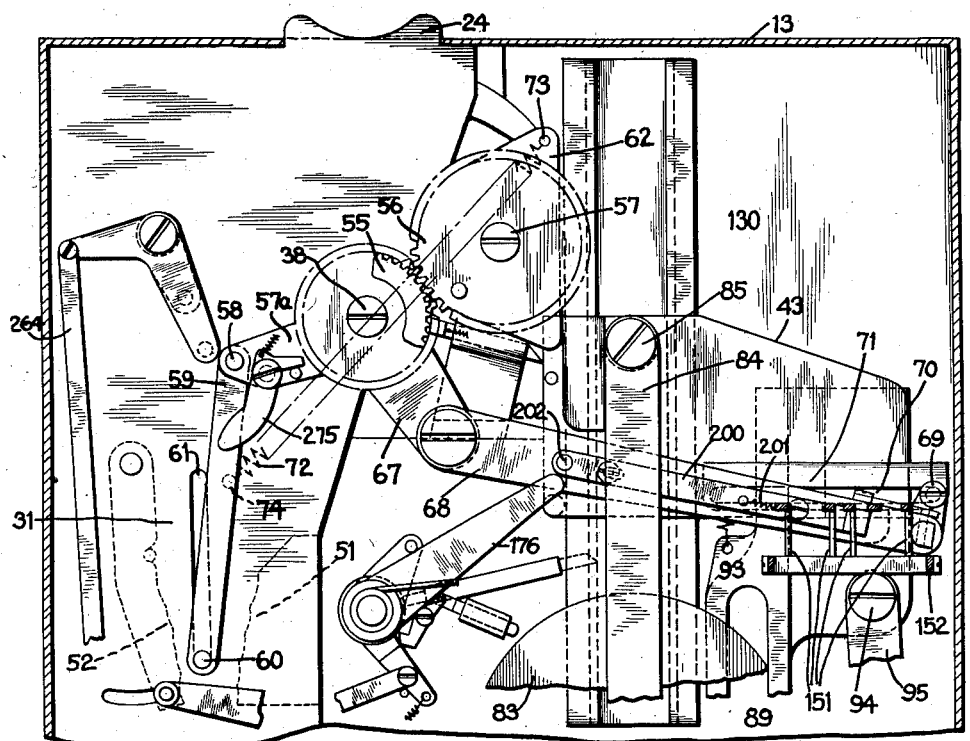
Fig. 8 illustrates the position which the mechanism assumes when there is no coin in the machine, either genuine or spurious, with the parts illustrated in the position taken after a 180° revolution of the operating crank.

Preferably located upon the stub shaft 38 (see Fig. 8) is a sector gear 55 which meshes with a sector gear 56 located upon the stub shaft 57. Fixed to the gear 55 is an arm 57ª the outer end of which is pivoted at 58 to one end of link 59, the other end of said link 59 being provided with a pin 60 operating in the slot 61 in the rear wall 31 of the chute 24. The pin 60 not only projects through the slot 61 but also across the passageway formed by the fixed member 51 and the pivoted member 52. When a coin is in the position illustrated in Fig. 2 the link 59 upon the operation of the operating crank moves downwardly until the pin 60 engages with the coin locked in operative position between the fixed member 51 and the pivoted member 52. Upon the shaft 57 Figure 16, is loosely mounted a spring pressed member 62 which is provided with a slot 63 (see Fig. 16) therein engaged by a stud 64 located upon the gear 56. This spring pressed member 62 has a projection which normally lies in the path of the slide member 43 as shown in dotted lines in Figure 1. The slide member when pulled downward by the link 84 engages this projection and rotates the spring pressed member which in turn rotates the sector gear 56 by mechanism now to be described. A spring 65 is employed for maintaining the member 62 in one extreme movement thereof with the stud 64 engaging in one end of the slot 63. One end of the spring 65 is connected to the pin 64 on the gear 56 and the other end of the spring is connected with the pin 66 located upon the member 62. The normal position of this member is clearly illustrated in Fig. 1. To the shaft 38 Figure 8, is also pivoted an arm 67 which has an angular movement corresponding to the angular movement of the gear 55. The outer end of this arm 67 is pivoted to one end of link 68. The other end of the link being provided with a pin 69 which moves horizontally back and forth in a slot 70 of a member 71 located upon the slide 43. For maintaining the gears 55 and 56 in normal position I employ a spring 72 one end of which is connected to a stud 73 on the member 62 and the other end of which is connected to a pin 74 projecting from the inner wall of the coin chute 24.

I will now proceed to describe the mechanism actuated by the controlling mechanism positioner for determining the amount of change to be delivered.

The operating crank of the machine is illustrated at 80 and is mounted upon a shaft 81 which is journaled in the boss 82 and which projects through the front wall of the machine. Upon the inner end of the shaft 81 is mounted a disk 83 to which one end of the arm 84, Figures 1 and 8, is eccentrically pivoted, the other end of this arm being pivoted at 85 to the slide 43. The rotation of the crank arm, therefore, imparts a reciprocating movement to the slide 43 and to that end the slide 43 is equipped with a slide element 86 (see Fig. 12) which is provided with flanges 87 engaging within correspondingly shaped grooves located upon the members 88 mounted upon the interior of the front wall of the machine. The dimension of the particular coin located in operative position in the machine determines the limit of downward movement of the link 59 by the engagement of the stud 60 thereon with that coin. This in turn determines the throw of the arm 68 to the right and thereby its throw together with mechanism about to be described will operate the change return mechanism to return the amount of change corresponding to the dimension of the particular coin deposited in operative position in the machine. Located upon the outer end of the arm 68, as before stated, is pin 69 which travels in the groove 70 of the member 71 illustrated in normal position in Fig. 1. If a ten cent piece is deposited in operative position in the machine the throw of the pin 69 is such that upon the downward movement of the slide 43 the pin 69 will engage with the finger 89ª of the slide member 89 which will operate mechanism to return five cents in change, as shown on Fig. 3. The lower end of this slide 89 is connected by suitable mechanism to be described later for operating a turn-stile to return a five-cent piece.

Figure 4:
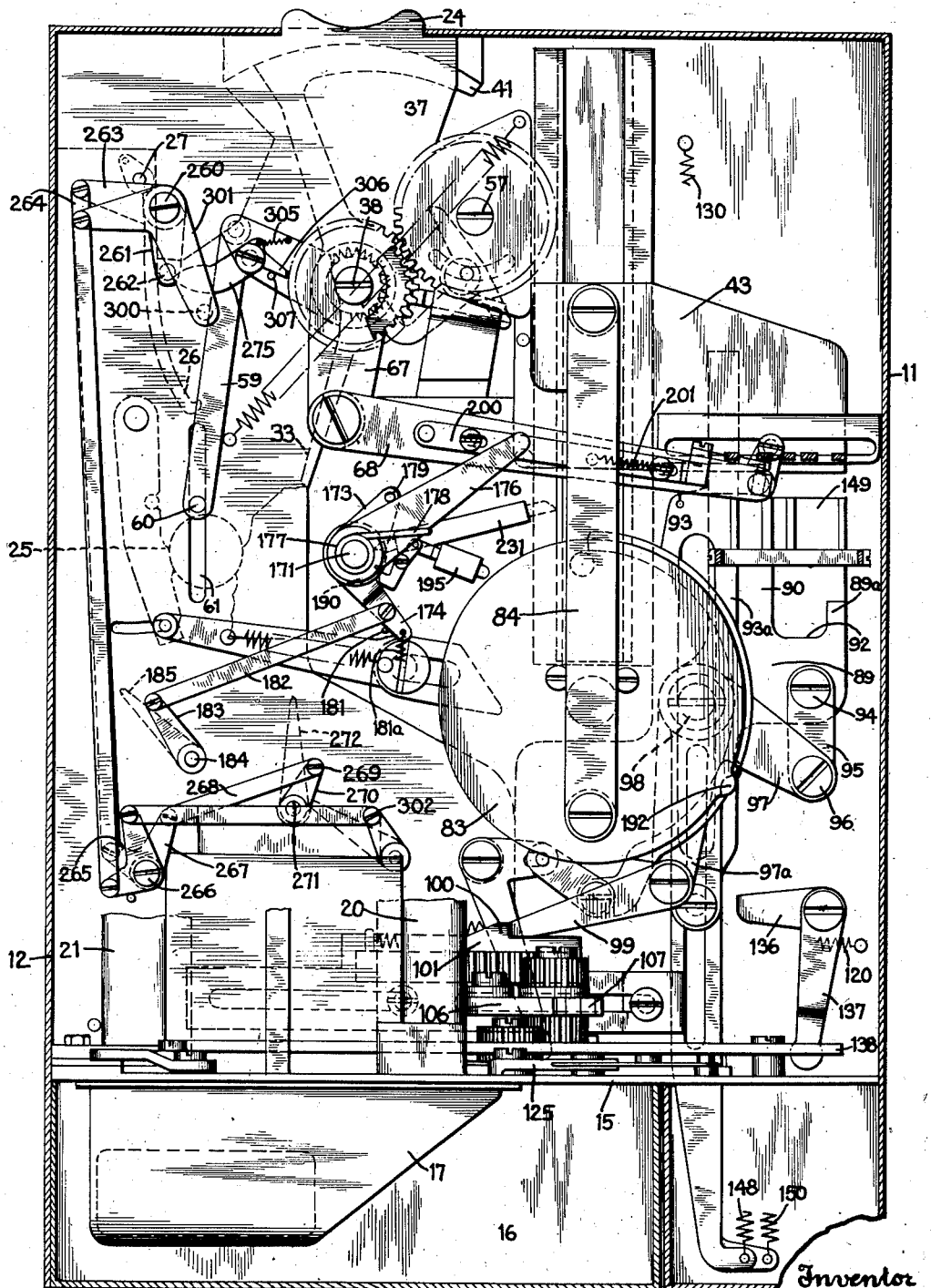
Fig. 4 illustrates a twenty-five cent piece in operative position with the mechanism in the same relative position as illustrated in Fig. 3, except that certain parts are in different positions, said positions having been predetermined by the particular coin deposited.
Figure 5:
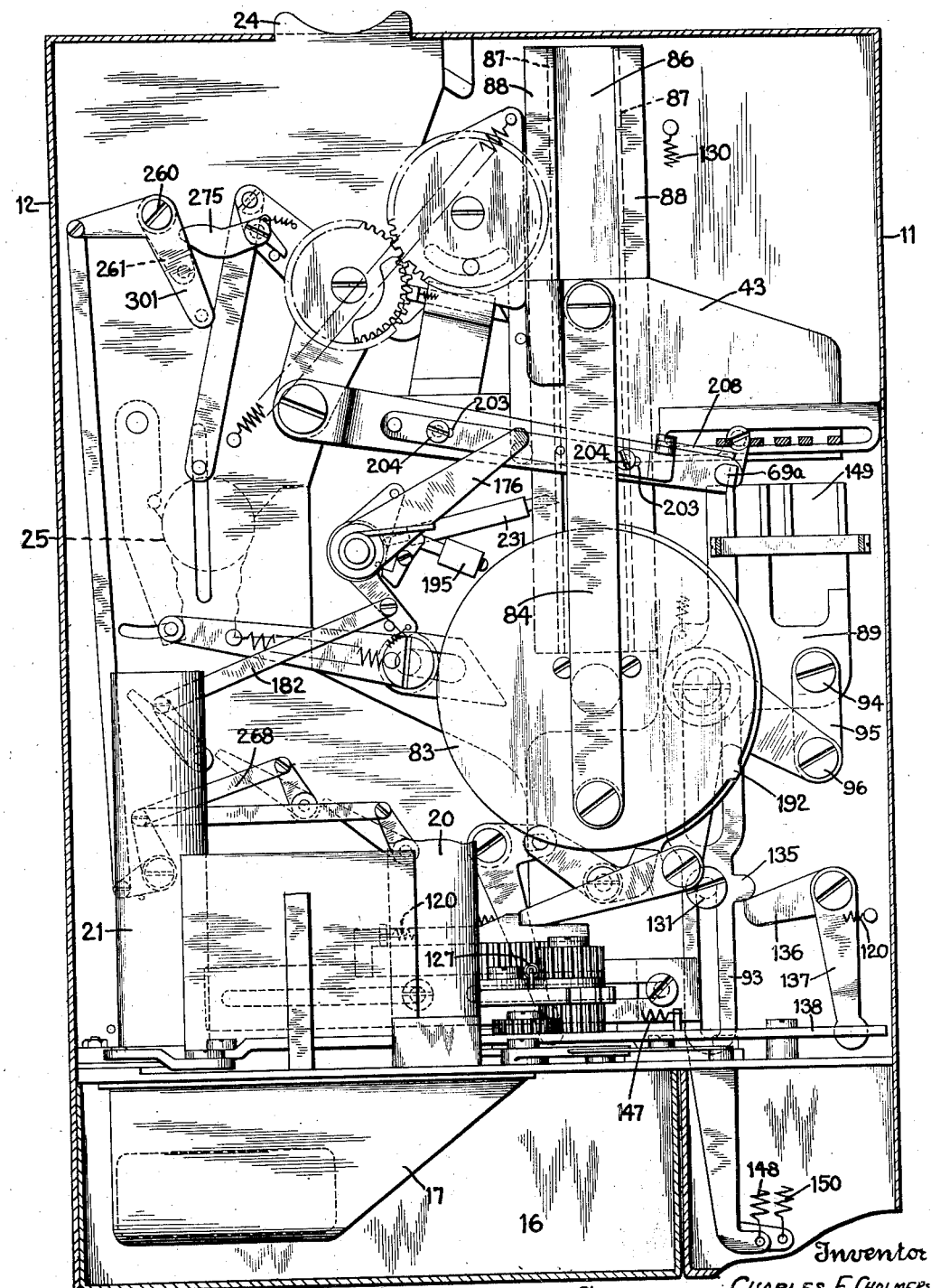
Fig. 5 is a view similar to Figs. 2, 3 and 4, illustrating a fifty cent piece in operative position in the machine, and the mechanism in a position predetermined by said piece.

If a twenty-five cent piece be deposited in the machine the pin 69 upon the downward movement of the slide 43 will engage with the inner edge the finger 90 of the slide 89, as illustrated in Fig. 4, and the turn-stile will be actuated to return four nickels. If a five cent piece or a one cent piece be deposited in operative position in the machine the pin 69 on the downward movement of the slide 43 will pass between the fingers 89ᵃ and 90 of the slide 89, that is to say, into the space 92, and will not operate the turn-stile mechanism.

If a fifty cent piece be deposited into operative position the pin 69 on the downward movement of the slide 43 will not only engage with the finger 90 of the reciprocating slide 89, but also with the finger 93ᵃ of the reciprocating slide 93, with a result that the continued downward movement of the slide 43 will operate the slide 89 to return four nickels through the turn-stile and the slide 93 to return a twenty-five cent piece by means of mechanism suitably connected thereto and described in detail below. To the slide member 89 (see Fig. 1) is pivoted at 94 one end of a link 95, the other end of this link at the point 96 being pivoted to one end of an arm 97 of a bell crank lever. This bell crank lever is pivoted at 98. Upon the end of the other arm 97ᵃ of the bell crank lever is pivotally mounted a pawl 99 which engages with the tooth 100 located upon a reciprocating bar 101 (see Figs. 2 and 9). This bar is provided with a rack 102 which engages with a pinion 103. The pinion 103 is mounted to rotate upon the pin 104 as an axis and secured thereto is an arm 105, Figure 9, upon the outer end of which is mounted a pawl 106 which is adapted to engage the teeth 107 of a circular ratchet wheel fixed on a second pinion 108 both of which rotate upon the same post 104 as an axis. Upon the movement to the left of the rack 102, as previously described, a rotary motion will be imparted to the pinion 103. The arm 105 and pawl 106 partake of this rotary movement. The pawl, however, carries with it the circular ratchet 107 and consequently the gear 108 to which this ratchet 107 is fixed. The gear 108 meshes with the pinion 109 which rotates about the axis of the stud 110 as a center.

The lower side of this pinion 109 is equipped with a turn-stile 111 fixed thereto and concentrically mounted on the stud 110. This turn-stile is equipped with a plurality of radiating arms 112. As shown in Fig. 9 there are four of these arms. Located adjacent to the pinion 109 is the coin magazine 20 in which is located a stack of nickels. This magazine is located upon a bracket 114 suitably fixed to the platform 15. This magazine, however, is spaced sufficiently from the platform 15 to enable five-cent pieces to be ejected therefrom by the rotation of the turn-stile 111, the arms of which pass under the magazine 20 for that purpose. It will therefore be understood that the vertical thickness of the arms 112 is not greater than the thickness of a five cent piece. The reason for this is to enable the arms to sweep under the magazine to eject a coin from the bottom of the coin stack. The magazine just described is so constructed that if a single five cent piece is to be returned a movement is imparted to the pinion 109 sufficiently to give a ¼ turn to this turn-stile thereby causing one of the arms to pass below the magazine to eject a nickel therefrom. If two nickels are to be returned as change, or three nickels to be returned as change, etc., a corresponding movement will be imparted to the pinion 109 and turn-stile 111, as will be understood. This is all controlled by the location of the pin 69 in the slot 70 of the slide member 71 which controls the distance to be moved by the slide member 89, and therefore, the slide member 101 and the rack 102 mounted thereon.

The downward limit of movement of the slide member 43 is at its maximum when the pivotal point on the disk 83 of the link 84 is in its lowest position. The continued rotation of disk 83 will positively return the slide 43 to normal position. The slide 89 and also the slide 101 to which the rack 102 is connected is returned to normal position by means of the spring 120. The slide 101 is provided with slots 121 and 122 which are engaged respectively by studs 123 and 124. These studs 123 and 124 serve as means for holding the slide 101 in proper position for its reciprocating movement.

The ends of the arms 112 of the turn-stile are somewhat V-shaped. Pivoted adjacent to the turn-stile is a spring pressed arm 125 (see Fig. 9) having thereon a V-shaped portion 126 to be engaged by the V-shaped ends of the arms 112. The purpose of this is to properly position the arms with respect to the coin magazine 20, that is to say, in such a way that the arms 112 will straddle the magazine and never stop below the coin stack. A spring 127 is employed for maintaining the pawl 106 normally in engagement with the teeth of the ratchet 107. It will be noted that when the rack 102 returns to normal position it will reverse the rotation of the pinion 103 carrying with it the arm 105, but that the pawl will return over the teeth of the ratchet 107 without operating the latter, as it will be understood.

It has been previously stated that when a fifty cent piece is deposited in operative position in the machine not only are four nickels returned but also a twenty-five cent piece. The return of the four nickels has been already described. The slide 89 is held in its upper position by means of the mechanism for connecting it with the slide 101; in other words, it is held in upper position by means of the spring 120. The slide member 93 is held in its uppermost position, that is to say, in normal position, my means of the studs 98 and 131. The lower end of the slide 93 is equipped with a laterally projecting lug 135 (see Fig. 5). Located in the path of movement of this lug is one arm 136 of a bell crank the other arm 137 of which engages with one end of a link 138. The other end of this link is pivoted to one arm 139 (see Fig. 9) of a bell crank the other arm 140 of which is forked to engage the stud 141. The movement, therefore, of the bell crank 139—140 imparts a reciprocating movement to the slide 142 having a fork projecting laterally therefrom to straddle the coin magazine 21 of twenty-five cent pieces. It will therefore be seen that when the slide 142 is reciprocated the arm 145 and the slide 142 is employed to eject a twenty-five cent piece from the bottom of the magazine 21, whereas in normal position the other arm 146 is employed primarily to maintain the lowermost coin in the magazine 21 in proper position concentric with the magazine. In other words it prevents the lowermost coin from being discharged from the stack of coins in this magazine. The link 138 is maintained in its normal position by means of a spring 147. The slide 93 is held in normal position by means of a spring 148 Figure 1, and the slide 149 is held by means of a spring 150. It may be stated, however, that the use of these two springs together with the slide 149 is more particularly adapted to be employed in connection with a multiple fare machine.

I will now proceed to describe the mechanism actuated by the controlling mechanism positioner for determining whether or not a fare is to be recorded on the master counter.

The pin 69 (see Fig. 12) is provided with a projecting portion 69$^a$. The portion 69$^a$ is provided with a groove in its periphery 69$^b$ which will be described below. If the coin has been accepted the pin 69 will be in its normal position and its horizontal location in the slide 71 will be determined by the dimension of the particular coin located in operative position in the machine. Upon the downward movement, therefore, of the slide 43 the portion 69$^a$ of the pin will strike one of the four fingers 151 (see Figs. 8 and 10) depending upon the dimension of the coin which has been accepted. This will depress the arm 152 to which the fingers are connected. This arm 152 is U-shaped, the bottom of the U being provided with an arm which extends rearwardly and then forwardly, the rearward extension being designated by the numeral 153 and the forwardly extending portion by the numeral 154. This arm 151—154 is pivoted at 155. The forwardly extending portion 154 is pivoted to one end of the link 156, the other end of which link being pivoted to the arm 157 of the master counter 158. The arm 157, the link 156, the arm 152 and fingers 151 are held in normal position by means of a spring 159. The counter illustrated at 158 is a type that is old and well known, the details of which need not here be described.

I will now proceed to describe the controlling mechanism positioner for determining the registering of any dimension of coin which it is desired to reject.

If the coin deposited in the machine is spurious, or a slug, or one that is not desirable to accept, then the lever 170 Figure 13, is given a partial rotation. This crank is mounted upon the outer end of the shaft 171 (see Figs. 4 and 13). Upon the shaft 171 is fixed the hub 172 having projecting therefrom an arm 173. Also fixed upon and projecting from the hub 172 is a second arm 174, as clearly illustrated in Figs. 4 and 13. Loosely mounted upon the shaft 171 is the hub 175. Projecting from this hub 175 is an arm 176. The inner end of the shaft is provided with a collar 177, to one end of which a spiral spring 178 encircling the shaft 171 is fixed, the other end of the spiral spring engaging under the arm 176 for the purpose of normally maintaining the same against the pin 179 projecting laterally from the arm 173. The crank 170, arm 173, arm 174, and arm 176 are maintained in normal position with the arm 174 in engagement with the pin 181 by means of the spring 181$^a$, Figure 6. To the arm 174 is pivoted one end of a link 182 the other end of the link being pivoted to an arm 183. Fixed upon a shaft 184 of the arm 183 is located a gate or switch 185 which controls the movement of the coins either to the compartment 16 or to the exterior of the machine. The normal position of the gate 185 is shown in Fig. 4. In this position the coins are received into the machine. When it is desired to reject a coin the crank 170 is manipulated thereby moving the gate 185 to the position illustrated in Fig. 6, after which the coin will be discharged into the passageway 19 leading to the tray 18 located upon the exterior of the machine. The hub 172 is provided with a notch 190. Opposite the notch 190 is a latch 191 which engages in the notch 190 when the crank 170 is moved to reject a particular coin and thereby locks the crank in that position. The disk 83 is provided with a projection 192 Figure 1, on its periphery which, during the later portion of the movement of the main operating crank, engages with a reciprocating plunger 194 slidably mounted in block 195. This effectively releases the catch and enables the crank arm 170 and the mechanism associated with the shaft 171 to return to normal position under the tension of the spring 181ª. Mechanism is also provided for locking the arm 170 in its said position to prevent its return until the complete revolution of the main crank arm. This is a fraud preventing device and will be described later.

Superimposed upon the arm 68 is a second arm or link 200 having a slight longitudinal movement relative to said arm 68 but held in normal position at one extreme limit of its movement of means of a spring 201. When the crank arm 170 is operated to reject a coin the arm 176 engages with the pin 202 located upon the arm 200 to move the latter to its other extreme position. To control the relative movement of the arms 68 and 200 a pin and slot connection is provided, the slots being indicated at 203 and pins at 204. The outer end of the arm 200 is provided with a lip 206 (see Fig. 6) to which is pivotally connected one arm 207 (see Fig. 12) of bell crank, the other arm 208 of which is provided with a slot 209 engaged by a relatively small pin 210 projecting downwardly through a slot 211 from the master pin 69. The movement to the left therefore, of the relatively movable arm 200 as viewed for example in Fig. 12, will operate the bell crank lever 207—208 in a clockwise direction, as viewed in Fig. 12, moving the pin 69 longitudinally in such a way that the latter will not operate the change return mechanism upon the downward movement of the slide 43. The inward movement of the pin 69 by means of the bell crank 207—208 will, however, bring the inner portion 69ª of the pin 69 into such a position that the peripheral groove 69ᵇ therein will be in alignment with one of the pins 151 thereby preventing the portion 69ª of the pins 69 from operating the master counter 158. The inward movement of the pin 69 will position the portion 69ª thereof so that upon the downward movement of the slide 43 this portion 69ª, depending upon the dimension of the coin deposited in the machine, will contact with one or the other of the spring pressed slides 216, 217, 218, 219 and 220 (see Fig. 11) to operate respectively counters 221, 222, 223, 224 and 225 (see Fig. 10) depending upon the dimension of the coin located in operative position in the machine.

Mention has been made above to the fact that the crank arm 170 is positively locked in the position to which it has been moved so as to not to be returned to normal position until after the register has been made upon the rejection counters. In other words, the crank 170 must be either in one of its two extreme limits of movement, otherwise, the main crank 80 cannot be operated. This mechanism for locking the crank 170 in one extreme position so as to reject a particular coin deposited comprises a plunger reciprocating in the housing 231, the housing itself being suitably fixed to the front wall of the machine. The inner end of the plunger is equipped with a protuberance 232 which engages in a slot 233 or a slot 234 in the hub 172. When engaged in one of these slots the crank 170 is locked in the position of accepting a coin and when engaged in the other slot the crank 170 is locked in the position for rejecting a coin. The protuberance 232 is held in engagement with the slots 233 and 234 by means of the slide 43 which engages the outer end 235 of the plunger thereby propelling the same by a cam connection into locking engagement with the hub 172.

I will now proceed to describe the controlling mechanism positioner for regulating the distribution of coins into the coin receiving compartment or into the stacks.

It has been stated above that the fifty cent pieces, ten cent pieces and one cent pieces received in the machine are to be deposited directly into compartment 16, but that the twenty-five cent pieces and the five cent pieces are conveyed into a position to be stacked in the coin magazines. It may be stated at this point that the twenty-five cent pieces and the five cent pieces are stacked from the bottom and this mechanism will also be presently described.

Pivoted at 260 Figure 4, is a bell crank on the end of the arm 261 of which is a pin 262. The outer end of the arm 263 of the bell crank lever is pivotally connected to one end of a link 264 the other end of this link being pivoted to one arm 265 of a second bell crank lever. This bell crank is pivoted at 266. The other arm 267 of the second bell crank is pivoted to one end of a link 268 the other end of the said link being pivoted at 269 to an arm 270 fixed to a shaft 271 upon which is fixed a gate or switch 272 illustrated in dotted lines in Fig. 4. The twenty-five cent piece discharged from operative position in the machine passes through the opening provided by the gate 272. When the gate 272 is closed it constitutes a part of the wall of a passageway as will more fully hereinafter appear, to enable the five cent pieces to pass thereover. The mechanism for operating the gate 272 will now be described. Upon the arm 57ª is pivotally mounted a second arm 275 which engages on the downward movement of said arm 57ª with the pin 262 located upon the bell crank lever 261—263. As will be seen this rotates the bell crank in a clockwise direction and from the mechanism previously described it will be seen that the gate 272 is thereby moved to the dotted line position illustrated in Fig. 4 to provide an opening through which the twenty-five cent pieces are discharged into position to be stacked in the magazine 21. The downward limit of movement of the trigger 275 is clearly indicated in Fig. 4, with the trigger opposite to and in engagement with the pin 262. If the circumference of the coin is smaller than the twenty-five cent piece the trigger will pass downwardly beyond the pin 262 and engage with the pin 300 located upon the arm 301 of another bell crank lever. This operates to open gate 302 by means of mechanism in all respect similar to the mechanism described in connection with the opening of the gate 272. When the trigger passes the pin 262 the gate 272 is immediately closed by means of spring 303 (see Fig. 1) so as to enable the gate 302 to be immediately opened. The trigger 275 will also pass beyond the pin 300 where the circumference of the coin is less than the circumference of the five cent piece. When this trigger passes the pin 300 the gate 302 is also immediately closed by spring 304 located in front of the spring 303 (see Fig. 1). The trigger 275 upon its return movement has a lost motion connection so that is freely passes by either or both of the pins 262 and 300. The trigger 275 is, however, held in normal operative position by means of a spring 305 which maintains the projection 306 of the arm 275 against the pin 307.

The twenty-five cent pieces received into the machine are discharged ultimately into the compartment or receptacle 310 adjacent to the magazine 21 whereas the nickels are discharged into the compartment or receptacle 311 adjacent the nickel magazine 20. Located below the compartments 310 and 311 is a slide member 312, (see Fig. 2) which is reciprocated back and forth by mechanism about to be described, with a result that the twenty-five cent pieces in the compartment 310 and the nickels in the compartment 311 will be fed to the bottom of the respective stacks of coins in the magazines 20 and 21. The coins in the respective stacks are supported upon the plate 313, which is provided with offsets 314 and 316 of such depth and so located that the coins being fed to the magazines engage below the lowermost coins in the stacks and thereby enables the same to be fed thereto. In other words the lowermost coins in each stack projects over the offsets 314 and 316 as the case may be, enabling the coins to be fed to the stack to engage below the surface of the lower most coin in said stack and move the stack as a whole upwardly. The mechanism for imparting a reciprocating movement to the member 312 will now be described. Located upon the disk 83 (see for example Fig. 1) is a pin 320. Upon the rotation of the disk 83 the pin 320 projecting laterally therefrom engages with the curved arm 321 and moves the same the first portion of the rotation of the disk 83 and holds the arm 321 in extended position during a half revolution of the disk 83 in a counterclockwise direction. This arm 321 is pivoted at 322 and constitutes one arm of a bell crank lever the other arm 323 of which is pivoted at 324 to one arm 325 of another bell crank lever the other arm 326 of which engages a slot 327 in the slide 328, (see Fig. 9). The slide 328 is provided with a laterally extending arm 329 which constitutes a part of or is directly connected to the reciprocating slide 312. A spring returns the curved arm 321 to normal position. It will therefore be seen that upon each revolution of the rotating disk 83 a to and fro movement will be imparted to the arm 321, and this movement of the arm 321 is transmitted to the slide 312 to reciprocate the same back and forth to feed the coins to the coin magazines in the manner previously described.

Inasmuch as the deposited coins are fed into the bottom of the change coin magazine 21 by the mechanism above described, the deposited coin must necessarily raise the coin positioned between the arms of ejecting fork of the ejecting slide 142 and in turn be inserted between the arms of the fork. Obviously the slide 142 must be stationary when the deposited coin is inserted or stacked in the change coin magazine. Although the discussion is directed to the insertion of a twenty-five cent piece into the magazine 21 the same discussion applies also to the inserting or stacking of a deposited five cent piece into the change return magazine 20 and the turnstile 111. The slide 312 which feeds or projects the deposited coins into their respective magazine must be timed so that the coins are inserted into the magazines when the coin ejecting mechanisms are stationary. It is for this reason that the pin 320 on the disk 83 engages the curved arm 321 immediately upon the first position of the rotation of the disk 83 and before the mechanism controlling the change coin ejecting mechanism begins to function. In this first movement the slide 312 inserts a deposited quarter into the magazine 21.

Shortly after the quarter has been inserted in the change magazine 21, the nickel change ejecting turnstile 111 is rotated to eject change coins from the magazine 20 and shortly thereafter or it may be timed to occur simultaneously with the nickel change ejection, the quarter slide 142 is reciprocated to eject a change quarter. This occurs during the first 180° of rotation of the disk 83 or more accurately occurs practically during the second 90° of rotation of the disk 83. During this period the pin 320 remains in contact with the curved arm 321 which holds the slide 312 in its extreme position towards the quarter change magazine 21. Upon completion of the coin ejecting movement and the return of the quarter slide 142 to normal position beneath the magazine 21, the pin 320 releases the curved arm 321 after the disk 83 has rotated substantially 180° and its return spring reciprocates the slide 312 to its normal position. On this return movement of the slide 312 the deposited nickel is projected or stacked into the nickel change return magazine 20.

Suitable mechanism is provided for moving the pivoted member 52 in a clockwise direction to enable the coins to be discharged from their operative position in the machine. This mechanism preferably comprises a slide member 340, one end of which is pivoted to the lower end of the arm 52 and the other end of which is provided with a slot 341 mounted upon a pin 342 for relative slidable movement therewith. This end of the slide is also provided with a beveled surface adapted to be engaged by the pin 320 on the disk 83 and thereby be cammed outwardly relative to the disk by the pin 320 thereby actuating the arm 52 to release the coins from their operative position in the machine. A spring 343 one end of which is connected to a fixed pin 344 on the stud 342 and the other end of which is connected to a pin 345 mounted upon the slide 340. This spring maintains the slide 340 and arms 52 in normal position.

It has been previously stated that the five and twenty-five cent pieces are discharged into the compartment 16 only through the magazines. Inasmuch as the coins are fed to the magazines from the bottom thereof these coins can only pass to the compartment 16 from the tops of these magazines. In other words, it is only after the magazines are full and overflowing that the five and twenty-five cent pieces pass from the top thereof to the compartment 16. To that end the five cent magazines are provided with an overflow 22 connecting with the compartment 16 and the twenty-five cent magazine is provided with an overflow 23 also connected to the compartment 16, as previously described.

I have illustrated and described what I now consider the preferred form of my invention. A number of the parts have been illustrated more or less diagrammatically and the size, proportion and construction of the various elements shown in the present embodiment are intended to serve for illustration purposes only. It is therefore to be expressly understood that I do not limit myself to the exact construction herein illustrated and described as many changes may be made in points of detail and various other embodiments resorted to without deviating from the true spirit and scope of my invention. In this connection reference is hereby made to my copending application, Serial No. 354,491, filed April 12, 1929, wherein I have claimed certain features of my invention shown and described herein; in other words, the patentable subject matter common to this application and my said copending application is claimed in the latter.

What I claim is:

1. A change making machine comprising means for receiving coins of different sizes deposited therein, a plurality of magazines adapted to contain stacks of coins of different denominations for change making, means for feeding the deposited coins to the bottoms of said stacks for change making and overflow means for said magazines for excess coins.

2. A change making machine comprising means for receiving coins of different denominations deposited in said machine, a magazine for coins, and means for conveying coins from said coin receiving means to the bottom of and stacking the same in said magazine, and means for utilizing the deposited coins in said magazine for change making, in combination with a chamber for receiving surplus coins, and a chute for conveying excess coins stacked in said magazine to said surplus chamber.

3. A fare collecting machine for collecting fares from coins of different sizes deposited therein, comprising coin receiving means, a plurality of magazines adapted to contain stacks of coins of different denominations for change making, means for feeding the change making coins to the bottoms of said stacks, overflow means for said magazines for excess coins, and means for simultaneously ejecting change coins from said magazines.

4. A change making machine for collecting fares from coins of higher denominations deposited in said magazine comprising a compartment for receiving deposited coins, a magazine for coins, means for conveying coins from said compartment to the bottom of and stacking the same in said magazine, and means for ejecting the deposited coins in said magazine for change making, in combination with a chamber for receiving surplus coins, and a chute for conveying excess coins stacked in said magazine to said surplus chamber.

5. A change making machine comprising means for receiving deposited coins of different denominations in the machine, a magazine for coins, means for conveying coins from said receiving means to the bottom of and stacking the same in said magazines, and means for utilizing the deposited coins in said magazine for change making, in combination with a chamber for receiving surplus coins, a chute for conveying excess coins stacked in said magazine to said chamber, and overflow means connecting the top of said magazine to said chute.

6. A change-making machine comprising means for receiving and gauging deposited coins of different denominations in the machine; a magazine for coins; means controlled by the coin denomination for conveying deposited coins from said coin receiving means to and stacking the same in the bottom of said magazine; means for discharging the requisite amount of change from said magazine, said discharging means comprising a turnstile having arms with V-shaped ends; and means adapted to cooperate with the ends of said arms to properly position the turnstile with respect to said magazine.

7. A change making machine comprising means for receiving and gauging deposited coins of different denominations in the machine; magazines for coins; means controlled by the denomination of the deposited coins for conveying said coins from the coin receiving means to and stacking the same respectively in the bottom of said magazines; means for discharging the requisite amount of change from said magazines, said discharging means comprising a turnstile adapted to eject coins from the bottom of one of said magazines; and means adapted to properly position said turnstile with respect to said magazine.

8. A change making machine comprising a change return mechanism, means for receiving and inspecting deposited coins of different denominations in said machine, a passageway leading from said receiving and inspecting means to the interior of the machine, and a passageway leading from said receiving and inspecting means to the exterior of said machine, in combination with means for actuating said change return mechanism, manually actuated normally inoperative mechanism for enabling spurious coins to pass into said second mentioned passageway when actuated to operative position, and means cooperating with the means for actuating said change return mechanism for locking said manually actuated mechanism in either its normally inoperative or actuated operative position when the means for actuating the change return mechanism is being operated.

In testimony whereof, I have hereunto set my hand this 18th day of February, 1925.

CHARLES E. CHALMERS.